No. 849,761. PATENTED APR. 9, 1907.
J. R. WEATHERLY.
MOWING MACHINE.
APPLICATION FILED JUNE 4, 1906.

2 SHEETS—SHEET 1.

Witnesses:
H. T. McKeever.
J H Mister

Inventor:
John R. Weatherly,
By Laws Bugger &Co.,
Attorneys

No. 849,761. PATENTED APR. 9, 1907.
J. R. WEATHERLY.
MOWING MACHINE.
APPLICATION FILED JUNE 4, 1906.

2 SHEETS—SHEET 2.

WITNESSES:

INVENTOR:
John R. Weatherly,

BY
Attorneys

UNITED STATES PATENT OFFICE.

JOHN R. WEATHERLY, OF ATLANTA, GEORGIA.

MOWING-MACHINE.

No. 849,761.  Specification of Letters Patent.  Patented April 9, 1907.

Application filed June 4, 1906. Serial No. 320,179.

*To all whom it may concern:*

Be it known that I, JOHN R. WEATHERLY, a citizen of the United States, residing at Atlanta, in the county of Fulton and State of Georgia, have invented certain new and useful Improvements in Mowing-Machines, of which the following is a specification.

My invention relates to improvements in mowing-machines. Its object is to provide more especially for actuating the cutter-bar and to effect the same with facility as well as to simplify the construction and arrangement of the parts.

Said invention consists of certain features substantially as hereinafter fully disclosed, and specifically pointed out by the claim.

Figure 1:
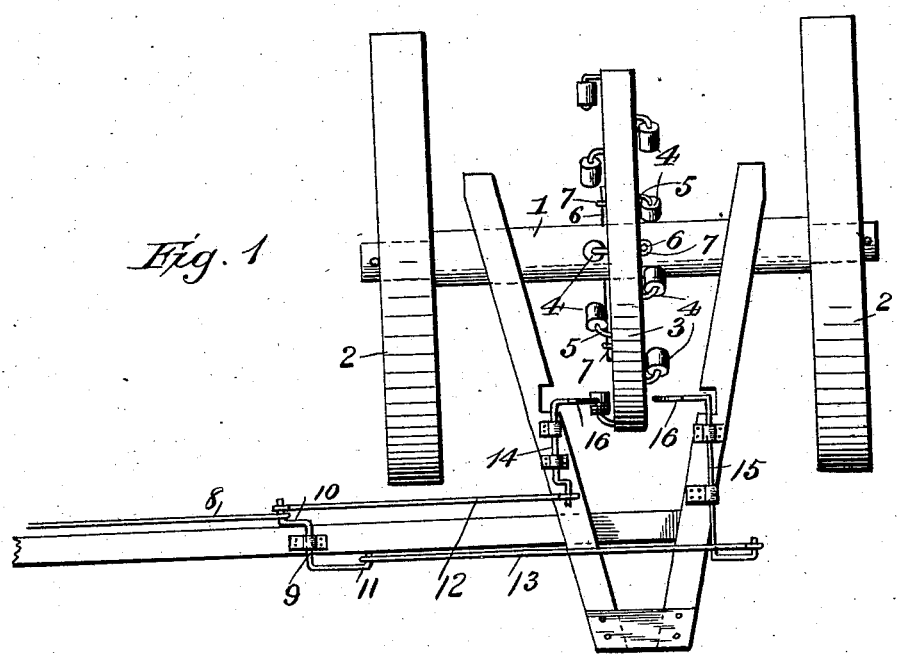
Figure 3:
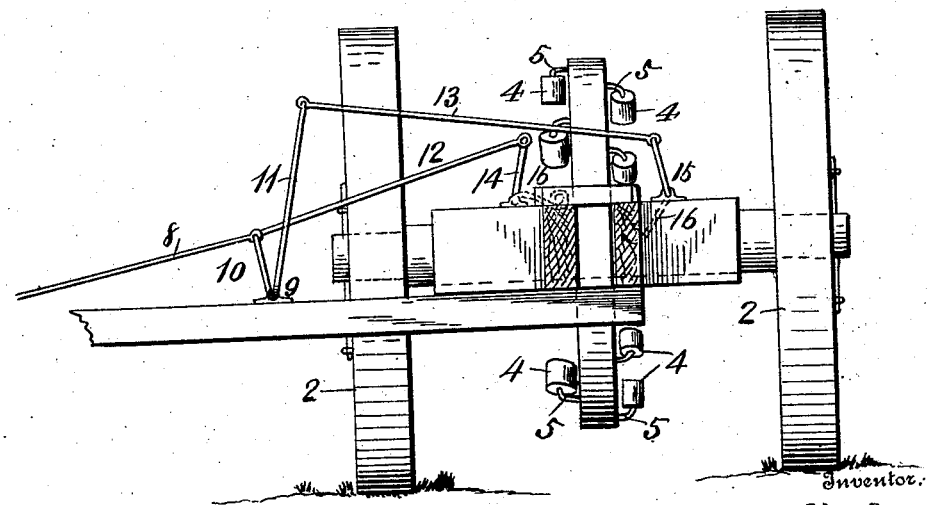
Figure 2:
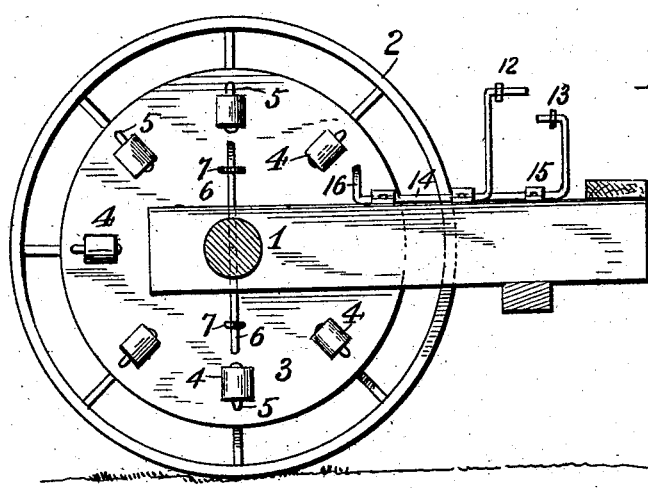
Figure 4:
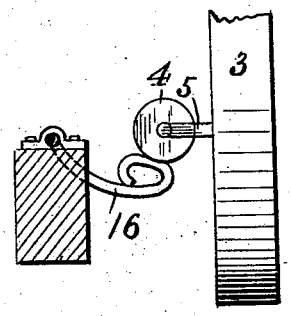

In the accompanying drawings, illustrating the preferred embodiment of the invention, Figure 1 is a plan view thereof. Fig. 2 is a vertical section taken through the wheel-axle or shaft of the transporting-wheels. Fig. 3 is a front elevation. Fig. 4 is a broken partial edge elevation and partial vertical section taken through the machine at the points of engagement between cutter-bar-actuating contrivances and the vibrating "cogless" wheel, so called.

In carrying out my invention I suitably secure to a common shaft or axle 1 wheels 2, and intermediately of said wheels is fixed to said shaft or axle a pinion or disk 3, which, however, is elevated out of contact with the ground and is equipped laterally, near the periphery, with two series of frictional rolls 4, having a circular arrangement, the individual rolls of the two series having staggered relation on opposite sides of said disk or pinion for producing an intermittent back-and-forth motion to the parts engaged thereby, as will be later appreciated. These rolls are hung or journaled on brackets 5, secured to the sides of the disk or pinion 3, so as to have movement upon their own axes to lessen friction. Said disk or pinion itself is held to its shaft or axle, preferably as shown, by radial pins or stout wires 6, passed through the shaft upon both sides of the disk or pinion, and through staples or eyes 7, fixed to said disk, and which pins are bent at right angles at their outer ends and bearing laterally against said pinion.

The pitman 8, in practice connected to the cutter-bar, (not shown,) is also connected to a shorter arm 10 of a rocking cranked shaft 9, suitably journaled in position upon a part of the machine-frame. Said cranked shaft has also connected to its shorter and to a longer arm 11 thereof rods 12 13, respectively, in turn connected to arms of right-angled crank-shafts 14 15, respectively, pivoted upon the machine-frame. The other arms of said shafts 14 15 are suitably formed or equipped, as at 16, for engagement with the rolls 4 of the pinion 3 for imparting the requisite intermittent reciprocating movement to the aforesaid parts for actuating the cutter-bar and its connected pitman. This arrangement, it will be noted, provides practically a "cogless" pinion and adjunctive parts for driving or actuating the cutter-bar, thus very greatly simplifying mechanism or gearing and lessening friction for the aforesaid purpose, as is apparent.

I claim—

A mower having a disk or wheel equipped with circular series of antifriction-rolls, the individual rolls having staggered relation upon opposite sides of the disk, a pitman for actuating the cutter-bar, three cranked rock-shafts, one having a shorter and a longer arm, said shorter arm being connected to said pitman and each of the other two rock-shafts having a shorter and a longer arm, and two connecting-rods, one arranged between the first-noted shorter arm and a corresponding arm of one other of said rock-shafts and the other connecting-rod being arranged between the first-noted longer arm and an arm of the third rock-shaft, said second and third rock-shafts having their cranks adapted to be engaged by said antifriction-rolls for their reciprocation.

In testimony whereof I have signed my name to this specification in the presence of two subscribing witnesses.

JOHN R. WEATHERLY.

Witnesses:
 JULIAN CLAYTON.
 J. W. MILAM.